United States Patent

Harry et al.

Patent Number: 5,871,278
Date of Patent: Feb. 16, 1999

[54] HAND-HELD ELECTRICAL BEATER-MIXER PREVENTING CONCOMITANT EMPLACEMENT OF ACCESSORIES

[75] Inventors: Jean-Michel Harry, Marrolles-les-Braults; Jean-Pierre Trocherie, Saint-Pierre-des-Nids; Jean-Jacques Linger, Laval, all of France

[73] Assignee: Moulinex, S.A., Paris, France

[21] Appl. No.: 894,355

[22] PCT Filed: Feb. 12, 1996

[86] PCT No.: PCT/FR96/00220

§ 371 Date: Jan. 26, 1998

§ 102(e) Date: Jan. 26, 1998

[87] PCT Pub. No.: WO96/25081

PCT Pub. Date: Aug. 22, 1996

[30] Foreign Application Priority Data

Feb. 16, 1995 [FR] France .................................. 95 01796

[51] Int. Cl.⁶ .............................. A47J 43/07; B01F 13/04
[52] U.S. Cl. ........................................... 366/129; 366/344
[58] Field of Search ..................................... 366/129, 130, 366/142, 197, 199, 206, 342–344, 601; 310/50

[56] References Cited

U.S. PATENT DOCUMENTS

| | | |
|---|---|---|
| 3,328,001 | 6/1967 | Zasadny et al. ......................... 366/129 |
| 3,533,600 | 10/1970 | Gerson ..................................... 366/129 |
| 3,595,093 | 7/1971 | Du Bois . |
| 3,604,114 | 9/1971 | Swanke et al. ........................... 366/129 |
| 3,619,754 | 11/1971 | Fuchs .................................. 366/129 X |
| 5,316,382 | 5/1994 | Penaranda et al. ...................... 366/129 |

FOREIGN PATENT DOCUMENTS

| | | |
|---|---|---|
| 28 02 155 | 7/1979 | Germany . |
| 29 04 159 | 12/1979 | Germany . |
| 3942712 | 6/1991 | Germany ............................... 366/129 |
| 4119328 | 12/1992 | Germany ............................... 366/129 |
| 381374 | 10/1964 | Switzerland . |

Primary Examiner—Charles E. Cooley
Attorney, Agent, or Firm—Young & Thompson

[57] ABSTRACT

An apparatus comprising a drive motor (7) with a shaft (8) having a front end for engaging a coupling device (20) for a whisk (10), and a rear end for engaging a drive (28) housed in a cylindrical body (31) and engageable by a mixing arm, as well as a vertically movable ejector member (51) linked to the coupling device. A movable mechanical assembly (70) is provided for releasing the ejector member (51) while blocking the internal space (74) in the body (31) so that only the whisk can be fitted, or alternatively locking the ejector member (51) in the down position while unblocking the internal space (74) in the body so that only the mixing arm can be fitted.

5 Claims, 3 Drawing Sheets

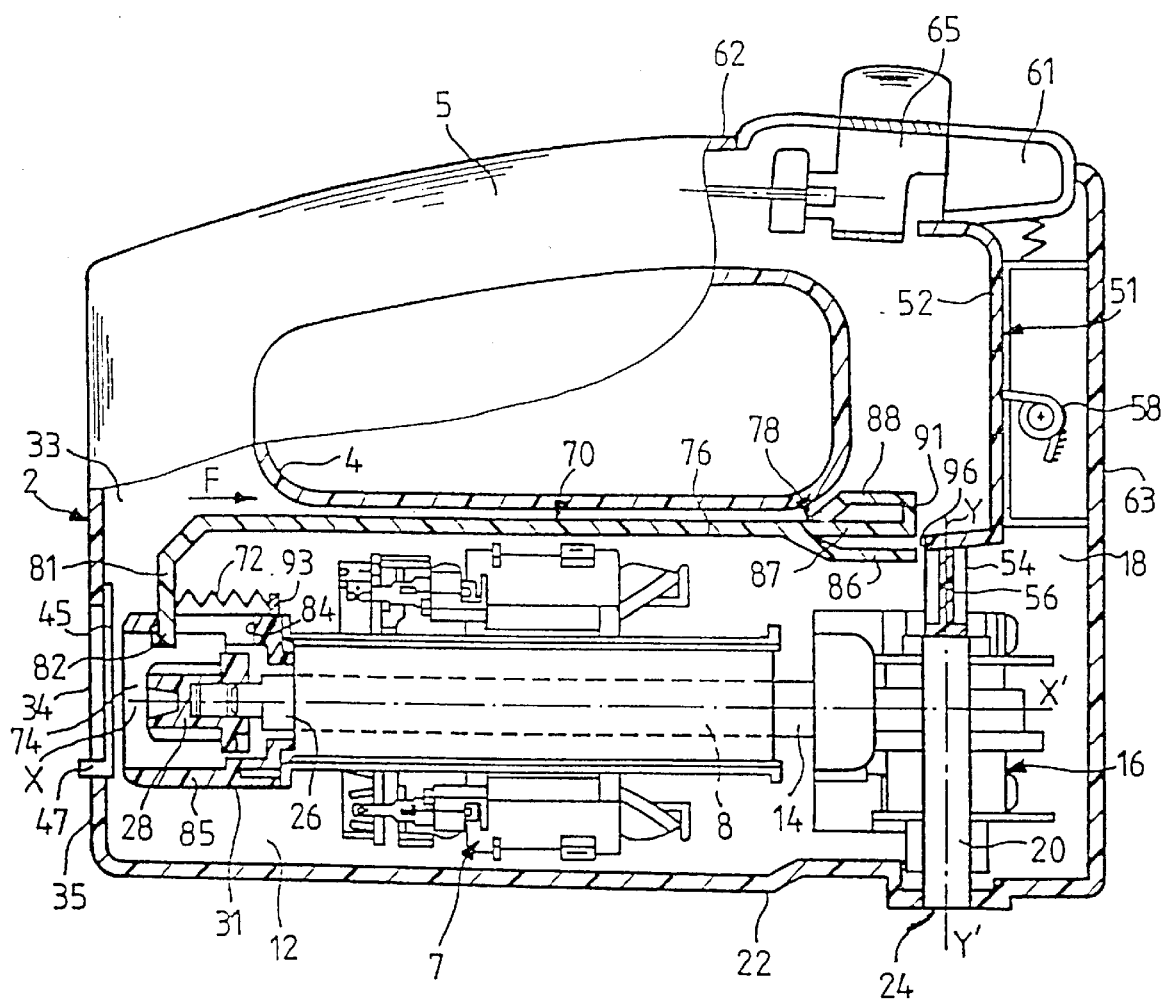
FIG_1

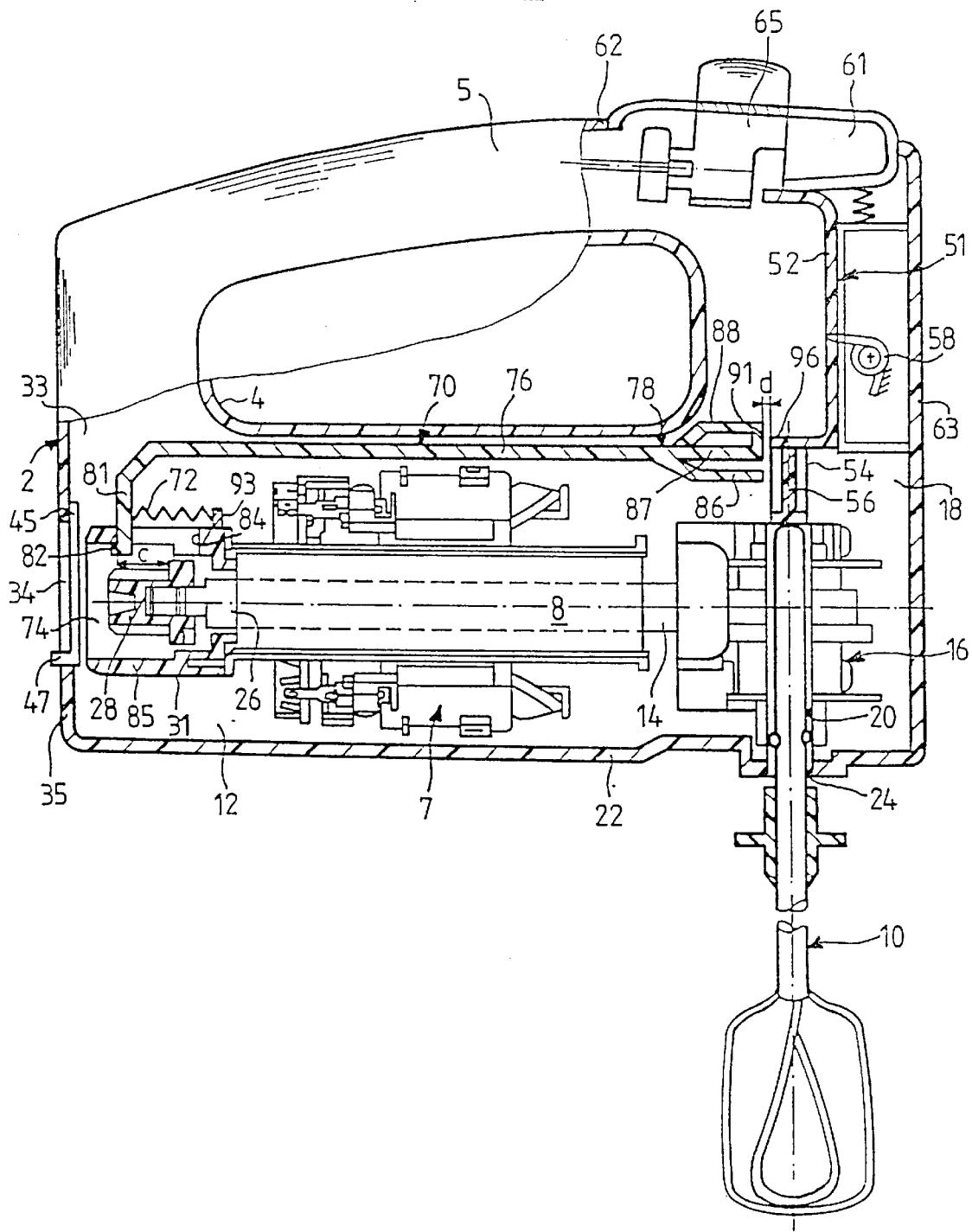
FIG_2

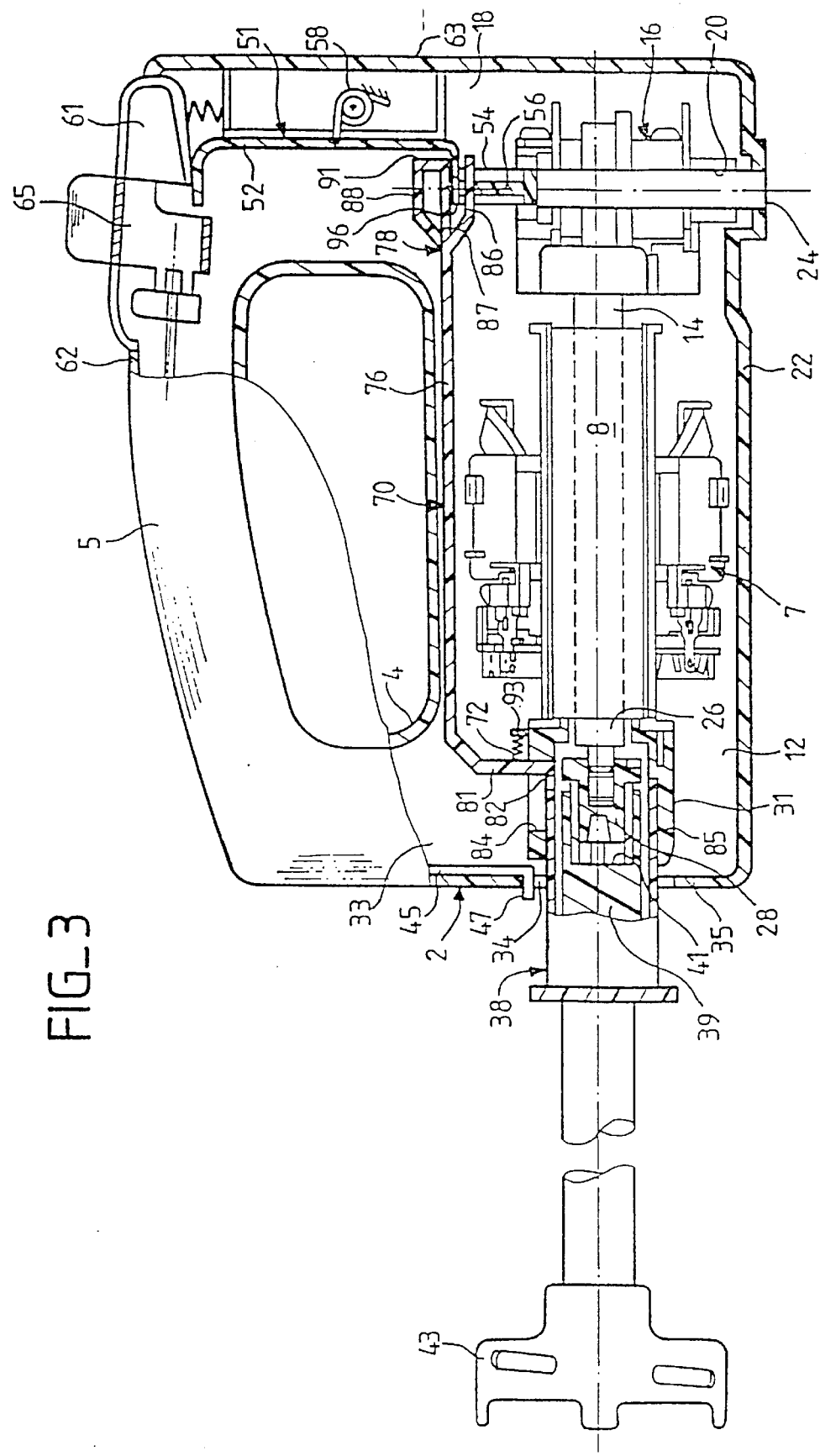
FIG_3

HAND-HELD ELECTRICAL BEATER-MIXER PREVENTING CONCOMITANT EMPLACEMENT OF ACCESSORIES

BACKGROUND OF THE INVENTION

The present invention relates to a hand-held electrical beater-mixer, particularly a kitchen beater-mixer, comprising a body of generally prismatic form containing an electrical drive motor which, considering the beater-mixer in its normal use position with at least one beating accessory such as for example a whisk, is disposed horizontally in the lower portion of said body, a rotatable coupling device of said beating accessory which is arranged in the forward portion of said body opening into the base of the latter, and which is connected to the front end of the drive shaft, a rotatable drive carried by the rear end of the drive shaft and disposed in a cylindrical securement socket of a mixing device which extends horizontally in the rear portion of said body and which is open facing an opening provided in the rear portion of the body and adapted to receive the mixing accessory, which mixing accessory comprises a shaft whose one end is adapted to couple with said drive, as well as an ejection member arranged vertically above and in communication with the coupling device of the beating accessory and displaceable in height from a lowered position to a raised position under the action of the beating accessory during its complete emplacement, and conversely from this high position to the low position in which it frees said beating accessory under the action of a manual control member.

There will be understood by beating accessory, a working tool of the whisk or mixer type, and by mixing accessory a working tool turning at high speed of the mixer foot type with a rotating helix, or again of the mixing bowl type with a rotating knife.

With the known apparatus of this type, it can happen that through mistake or negligence, the user mounts at the same time the beating accessory and the mixing accessory in the body of the apparatus, then carries out actuation of the apparatus; the two tools working in simultaneous movement, of respectively different types, giving rise to the danger of exposing the user to serious wounding.

SUMMARY OF THE INVENTION

The invention has for its object to overcome this risk and to provide a hand-held electric beater-mixer, of the type set forth above, which guarantees in a simple manner absolute safety for the user by preventing the concomitant emplacement of the two accessories, respectively for beating and for mixing, and hence their simultaneous function.

According to the invention, the beater-mixer comprises moreover movable mechanical means urged by resilient return means and adapted on the one hand to free the displacement of the ejection member whilst preventing the passage into the interior of the socket so as to permit only the emplacement of the beating accessory, and on the other hand to block, against said resilient return means, the ejection member in lowered position whilst freeing the passage to the interior of the socket so as to permit only the emplacement of the mixing accessory.

Thus, thanks to these mechanical safety means acting by their selective interaction between the ejection member and the interior of the socket of the apparatus, it is thereafter impossible to emplace simultaneously the two accessories, respectively of beating and mixing, thereby avoiding any risk of wounding during actuation of the apparatus.

BRIEF DESCRIPTION OF THE DRAWINGS

The characteristics and advantages of the invention will become further apparent from the description which follows, by way of non-limiting example, with reference to the accompanying drawings, in which:

FIG. 1 is a fragmentary vertical cross-sectional view of a beater-mixer according to the invention, in stopped position and in the absence of an accessory;

FIG. 2 is a view identical to that of FIG. 1, but with a beating accessory; and

FIG. 3 is a view identical to FIG. 1, but with a mixing accessory.

DESCRIPTION OF THE PREFERRED EMBODIMENT

The hand-held beater-mixer shown in FIG. 1 comprises a body 2 of generally prismatic shape having a hollow portion 4 which delimits a handle 5, and containing an electric drive motor 7 provided with a shaft 8 having an axis XX' and disposed, during normal use with at least one beating accessory such as for example a whisk 10 as shown in FIG. 2, in the lower portion 12 of the body 2 extending horizontally.

The shaft 8 of the drive motor 7 carries at its forward end 14 an endless screw (not shown) which coacts with two helicoidal pinions each turning about a vertical axis YY' perpendicular to the axis XX', and which form with the latter a reducer 16. These two helicoidal pinions are located in the forward portion 18 of the body 2 and are connected respectively to two coupling devices 20 along the axis YY', of which only one is visible in FIG. 1, which open into the base 22 of the body 2 by two openings 24 in which can be engaged side by side, or one behind the other, two whisks 10 of which only one is shown in FIG. 2.

As to FIG. 1, the rear end 26 of the shaft 8 of the drive motor 7 bears a horizontal drive 28 disposed in a cylindrical socket 31 which extends horizontally in the rear portion 33 of the body 2 and which is open facing an opening 34 provided in the rear wall 35 of the body 2 and adapted for the engagement of a mixing accessory such as for example a mixing foot 38 as shown in FIG. 3, said mixing foot 38 (FIG. 3) being adapted to come into securement, for example by screwing, into the socket 31 and enclosing a shaft 39 whose forward end 41, opposite the paddle 43 received in a helix (not shown), is adapted to couple with the drive 28.

As shown in FIG. 1, the coupling opening 34 is closed by a sliding closure 45 which is guided along the internal surface of the rear wall 35 of the body 2 with the possibility of vertical sliding and which is closed by means of a manually operated member 47 which projects rearwardly through the opening 34.

The beater-mixer moreover comprises a moveable ejection member 51 arranged vertically in the forward portion 18 of the body 2 and comprising an upper portion 52 of vertical U shape and a lower portion 54 comprised by two vertical cylindrical pins 56, of which only one is visible in FIG. 1, having at their upper portion a passage (not shown) and each coacting with the corresponding coupling device 20. This ejection member 51 is urged by a spring 58 and is displaceable in height to pass from a lowered position, defined in the absence of the whisks (FIG. 1), to an upper position in which the pins 56 are actuated by the whisks during their complete engagement, and hence their locking, in the associated coupling device 20 (FIG. 2), and conversely from this upper position corresponding to the mounting of the whisks to the lower position in which the ejection member frees the whisks under the action of a manual control button 63 mounted resiliently in front of the handle 5 in the upper wall 62 of the body 2, immediately adjacent the front wall 63 of said body.

In the drawings, there is shown at 65 a lever mounted in the upper wall 62 of the body 2, adjacent the rear of the button 63, and adapted, in a manner known per se, to actuate a switch (not shown) which starts and stops the motor and adjusts its speed of rotation.

According to the invention, the beater-mixer comprises moreover movable mechanical means 70 urged by a return spring 72 and adapted on the one hand to free the displacement of the ejection member 51 whilst blocking the internal passage 72 of the socket 31 so as to permit only the emplacement of the whisks 10 (FIG. 2), and, on the other hand, to block against the return spring 72 the ejection member 51 in lowered position whilst freeing the internal passage 74 of the socket 31 so as to permit only the emplacement of the mixer foot 38 (FIG. 3).

In the embodiment shown in FIGS. 1 to 3, these mechanical safety means 70 are constituted by a metallic sliding strip or rod 76 which is arranged horizontally below the hollow portion 4 of the body 2, whose front portion is in the form of a disconnectable blocking member 78 for the ejection member 51, and whose rear portion is in the form of a locking tongue 81 engaged by its free end forming a lug 82, within the socket 31 through a slot 84 provided in the side wall 85 of the socket 31.

In this example, the disconnectable blocking member 78 of the ejection member 51 is shaped as a vertical fork with three teeth 86, 87 and 88 whose respective free ends, two by two, that is the central tooth 87 and the upper tooth 88, are interconnected by an abutment surface 91.

As shown in FIGS. 1 to 3, the return spring 72 of the strip 76 is a compression spring interposed between the lower portion of the locking tongue 81 of the strip 76 and a vertical tab 93 provided on the external surface of the side wall 85 of the socket 31, adjacent the bottom of this latter.

In the stopped position of the beater-mixer, in the absence of any accessory, as shown in FIG. 1, the strip 76 occupies a rest position in which its forward portion with the three teeth 86, 87 and 88 is in the disconnected condition relative to the ejection member 51 in lowered position, which ejection member is thus rendered free, whilst its locking tongue 81 coacts by bearing with its lug 82 against the internal surface of the side wall 85 of the socket 31, under the action of the compression spring 72.

Referring to FIG. 2, the strip 76 occupies a beating position which corresponds to its rest position in FIG. 1 in which the ejector is freed and thus permits the emplacement of the whisks 10. During this emplacement of the whisks 10 in the corresponding coupling device 20, FIG. 2, the free end of each of the whisks 10 urges the corresponding pin 56 of the ejection member 51 to cause this latter to pass from the lower position to its upper position in which an abutment surface 96 provided on the lower branch of the upper portion 52 of U shape of the ejection member 51 comes opposite the abutment surface 91 of the strip 76; these two abutment surfaces 91, 96, respectively, facing each other, are separated by a distance d substantially less than the stroke c of complete emplacement of the mixer foot in the socket 31.

Thus, in the beating position shown in FIG. 2, if the user introduces the mixer foot through the opening 34, after opening the closure 45, the mixer foot displaces the lug 82 over the distance d for which the surface 91 of the strip 76 comes into abutment against the surface 96 of the ejection member 51; this distance d being less than the total stroke c of the mixer foot, this latter cannot therefore be completely emplaced in the socket 31.

From the beating position of FIG. 2, the whisks 10 can be freed by the ejection member 51 under the action of the control button 61, said ejection member returning to its lowered position as shown in FIG. 1.

With reference to FIG. 3, the strip 76 occupies a mixing position in which it is brought by sliding in the direction of the arrow F of FIG. 1, under the action of emplacement by screwing in of the mixer foot 38, after opening the closure 45, thus giving rise to the longitudinal displacement of the lug 82 of the locking tongue 81 within the socket 31, against the compression spring 72; at the end of screwing of the mixer foot 38, the shaft 39 of this latter is coupled with the drive 28. In this mixing position, FIG. 3, the upper portion of each pin 76 of the ejection member 51 in lowered position is in engagement, by its disengagement passage, with the lower tooth 86 of the forward portion of the strip 76; the ejection member 51 being blocked in lowered position by the forward portion of the strip 76, the whisks cannot therefore be completely emplaced in their respective coupling devices 20.

From the mixing position of FIG. 3, the mixer foot 38 can be simply removed by unscrewed, the strip 76 then returning, under the action of the compression spring 72, into its rest position as shown in FIG. 1.

We claim:

1. A hand-held electrical beater-mixer comprising:
    a body (2) of generally prismatic shape;
    an electric drive motor (7), with a shaft (8), contained within said body (2) and disposed horizontally in a lower portion (12) of said body (2) when said beater-mixer is in its normal use position with a beating accessory (10);
    a rotatable coupling device (20) of the beating accessory (10) positioned in a forward portion (18) of said body (2) and opening through a base (22) of said body (2), said rotatable coupling device (20) being operatively connected to a forward end (14) of said shaft (8);
    a rotatable drive (28) carried by a rear end (26) of said shaft (8) and disposed within a cylindrical socket (31) extending horizontally in a rear portion (35) of said body (2), said cylindrical socket (31) comprising a passage (74) facing an opening (34) in a rear wall (35) of said body (2), said rotatable drive (28) being adapted to secure a mixing accessory (38) having a shaft end (39) adapted for coupling with said rotatable drive (28), and said opening (34) being adapted for the transit of the mixing accessory (38) into said passage (74);
    an ejection member (51) arranged vertically above and in communication with said rotatable coupling device (20), said ejection member (51) being displaceable in height from a lowered position to an upper position under the action of engaging the beating accessory (10) into said rotatable coupling device (20);
    a manual control member (61) operatively connected to said ejection member (51) so that action of said manual control member (61) moves said ejection member (51) from the upper position to the lower position, the movement of said ejection member (51) from the upper to the lower position disengaging the beating accessory (10) from said rotatable coupling device (20);
    a mechanical movable means (70) located within said body (2) and operatively connected to a resilient return means (72), said ejection member (51), and said passage (74) so as to block said passage (74) and preclude the coupling of the mixing accessory (38) with said rotatable drive (28) when said ejection member (51) engages the beating accessory (10), and so as to block said resilient return means (72) against said ejection member (51) so as to preclude the engagement of the accessory (10) with said rotatable coupling device (20) when coupling the mixing accessory (38) with said rotatable drive (28) interior to said socket (31) such that said mechanical movable means permits only one of the mixing accessory (38) and the beating accessory (10) to be used with said beater mixer.

2. The beater-mixer of claim 1, wherein said body (2) further comprises a hollowed portion (4) delimiting a handle (5);

said mechanical movable means (70) further comprises a strip (76), said strip (76) positioned horizontally below said hollowed portion (4);

said strip (76) comprising, a forward portion in the form of a disconnectable blocking member (78) positionable for operatively engaging said ejection member (51), and a rear portion in the form of a locking tongue (81) positionable for operatively engaging said socket (31) through a slot (84) provided in a lateral wall (85) of said socket (31), said strip (76) being movable into a beating position in which said disconnectable blocking member (78) is disengaged from said ejection member (51) so as to render said ejection member (51) free to move and thus permitting the engagement of the beating accessory (10) with said coupling device (20) while said locking tongue (81) coacts in abutment against an internal surface of said lateral wall (85) of said socket (31) to prevent the coupling of said mixing accessory (38);

said disconnectable blocking member (78) and said ejection member (51) further comprising respective abutment surfaces (91, 96) located facing each other when said strip (76) is in said beating position, said abutment surfaces being separated by a separation distance so that the abutment of said abutment surfaces (91, 96) restricts movement of said locking tongue (81) with respect to said internal surface of said lateral wall (85);

said strip (76) further being movable into a mixing position in which, under the action of inserting the mixing accessory (38) into a coupling position, said strip (76) is urged against said resilient return means (72), said locking tongue (81) is disengaged from said internal surface of said lateral wall (85) and moves a lateral coupling distance so as to permit coupling of said mixing accessory (38) with said rotatable drive (28), and said disconnectable blocking member (78) moves into position to prohibit movement of said ejection member (51) and prohibit engagement of said beating accessory (10) with said coupling device (20).

3. The beater-mixer of claim 2, wherein said strip (76) is mounted slidably within said body (2), and, in the beating position, said separation distance is less than said lateral coupling distance.

4. The beater-mixer of claim 3, wherein said ejection member (51) further comprises in a lower portion a pin (56) with a disengagement passage;

said disengageable blocking member (78) being shaped as a vertical fork with an upper tooth, a central tooth, and a lower tooth (86, 87, 88), each of said teeth having a free end;

said central tooth and said upper tooth being connected by said disconnectable blocking member abutment surface (91); and wherein when said strip (76) is in the mixing position, said lower tooth aligns with and moves into said disengagement passage.

5. The beater-mixer of claim 2, wherein said resilient return means (72) comprises a compression spring interposed between said locking tongue (81) and a vertical tab (93) provided on an external surface of said lateral wall (85).

* * * * *